(12) United States Patent
Green et al.

(10) Patent No.: US 7,362,653 B2
(45) Date of Patent: Apr. 22, 2008

(54) UNDERWATER GEOPOSITIONING METHODS AND APPARATUS

(75) Inventors: Maurice D. Green, North Falmouth, MA (US); Kenneth F. Scussel, East Falmouth, MA (US)

(73) Assignee: Teledyne Benthos, Inc., North Falmouth, MA (US)

(*) Notice: Subject to any disclaimer, the term of this patent is extended or adjusted under 35 U.S.C. 154(b) by 174 days.

(21) Appl. No.: 11/400,709

(22) Filed: Apr. 7, 2006

(65) Prior Publication Data

US 2007/0025185 A1 Feb. 1, 2007

Related U.S. Application Data

(60) Provisional application No. 60/675,250, filed on Apr. 27, 2005.

(51) Int. Cl.
*G01S 3/80* (2006.01)
(52) U.S. Cl. .............. 367/124; 367/127; 367/131; 367/134
(58) Field of Classification Search ............... 367/118, 367/124, 127, 134, 131
See application file for complete search history.

(56) References Cited

U.S. PATENT DOCUMENTS 5,331,602 A 7/1994 McLaren
5,894,450 A * 4/1999 Schmidt et al. ............. 367/134
6,390,012 B1 * 5/2002 Watt et al. .................. 114/322
6,501,704 B2 12/2002 Nishimura
6,768,702 B2 7/2004 Brown
6,865,139 B2 * 3/2005 Hudson ...................... 367/131

OTHER PUBLICATIONS

Kinsey, James C. and Whitcomb, Louis L., "Preliminary Field Experience With The DVLNAV Integrated Navigation System For Oceanographic Submersibles", Preprint submitted to Elsevier Science, Aug. 29, 2003.

* cited by examiner

*Primary Examiner*—Ian J. Lobo
(74) *Attorney, Agent, or Firm*—Francis J. Caufield

(57) ABSTRACT

A method and apparatus for determining the geophysical position of an autonomous underwater system utilizing underwater acoustic modems that exchange broadband underwater acoustic signals. The method of the invention includes the steps of initiating an exchange of broadband acoustic signals between the autonomous system of unknown geophysical position and a base system of known geophysical position wherein the depths of both systems is known. A bearing calculation is made on one of the signals transmitted between the systems, preferably through the use of an array of hydrophones placed closely together at predetermined locations on either the autonomous or base system. Also, the range between the two systems is determined by measuring the time of travel of at least one signal. By the acoustic transmission and sharing of information, as needed, about the known depths of the systems, the known geophysical position of the base system, and the range between the systems, sufficient data is gathered at one or both systems and used to determine the geophysical position of the autonomous system.

5 Claims, 6 Drawing Sheets

UNDERWATER GEOPOSITIONING METHODS AND APPARATUS

CROSS-REFERENCE TO RELATED APPLICATION

This application claims the benefit of priority from pending U.S. Provisional Patent Application No. 60/675,250 entitled UNDERWATER GEOPOSITIONING METHODS AND APPARATUS which was filed on Apr. 27, 2005 the entire contents of which are incorporated herein by reference.

GOVERNMENT LICENSE RIGHTS

The U.S. Government has a paid-up license in this invention and the right in limited circumstances to require the patent owner to license others on reasonable terms as provided for by the terms of SBIR Contract No. N00014-02-M-0135 awarded by the Office Of Naval Research.

FIELD OF THE INVENTION

This invention in general relates to underwater geopositioning methods and apparatus and in particular to methods and apparatus by which the geophysical position of an autonomous underwater system can be determined through the use of underwater acoustic modems exchanging broadband acoustic communication signals.

BACKGROUND AND INVENTION

Undersea mobile or autonomous systems, whether manned or unmanned, generally have no direct link to conventional positioning assets such as the global positioning system (GPS), or to other radio frequency (RF)-accessible assets. The need for navigational assistance beneath the water is further exacerbated by the general lack of available visible references. The navigation technologies available today for unmanned undersea vehicles (Mobiles) are expensive and operationally limiting. Typical systems utilize some combination of four techniques: 1) Doppler velocity logs (DVL) which provide navigational information by "pinging" the bottom of the seafloor and calculating the position of the system by "following" the system's movement with respect to the bottom. These systems, however, generally have very limited depth capability (30 meters below the vehicle is typical); 2) Long baseline (LBL), another technique which operates by relying on a series of fixed underwater transponder beacons. A transducer on the mobile system emits a signal that the beacons detect, after which the beacons emit response signals. The mobile estimates its distance from each of the beacons by timing the travel of the signals, thus enabling it to calculate its own position relative to the known positions of the beacons. This technique offers precision, but requires extensive preparation and surface expression by the deploying asset (e.g., a small craft)—a factor of importance in military applications; 3) inertial navigation, a complex and costly technique which relies on precise measurement of acceleration and rotation of the autonomous system and typically has a drift rate on the order of 1 nm/hour without compensation from a DVL or LBL; and 4) GPS surface fix, which places limitations on sea state capability and which offers precision dependent on the amount of time spent on the surface. Of these four, the LBL system is the least intrusive on, and least expensive for the vehicle, but deploying enough acoustic sources to cover a significant area (say, 5 km by 5 km) is problematic and expensive in terms of the time of the deployment vessel.

The successful and relatively low-cost navigation systems (e.g., LBL) are based in some way on the use of underwater acoustic energy transmitted from one system component to another in such a way that distance may be inferred from the time taken for the energy to reach its intended receiver. An example of such a system is described in detail in U.S. Pat. No. 6,501,704. There is a direct and well-understood relationship between the speed of sound and the range between transmit and receive components. However, the relationship is parameterized on water temperature and salinity, which are often difficult to measure. In most cases, an average sound speed is assumed, and the resulting errors are either accepted or are subject to statistical operations to reduce them.

There are two ways to use the relationship between time delay and range. In the first case, all system components are assumed to employ highly accurate and highly synchronized clocks. Thus, when a component transmits energy, it is assumed that the receiver precisely knows the time at which the transmission occurred. The actual time of arrival, therefore, is a direct measure of range, even though based on an average sound speed. The second case relies on the ability of the receiver to respond with an immediate reply to a received signal. At the location of the first transmitter, the total delay time is simply divided by two, and the range is inferred. This is a transponder system. If the intended receiver imposes a small internal delay (due to finite computation speed, for example), that has little affect, provided the original transmitter has knowledge of that delay.

LBL systems, being the most common technique currently in use, employ an assumption of sound being spherically radiated from multiple distant source nodes (using either clocks or transponder approaches). At the mobile, one employs a "simple" algorithm that relates the intersection of spheres to a common point. This point can only be calculated if the mobile has a priori knowledge of the positions of the multiple sound sources. If the positions are known in a 3-dimensional Cartesian coordinate system, then the mobile locates itself within that system. If the geo-locations of the sources are also known, then the mobile can also position itself within global coordinates. It is emphasized that the locations of the sources must be pre-programmed into the mobile prior to release of the unit.

The introduction of acoustic communications (acomms) into the positioning effort greatly simplifies the entire process. Source nodes can inform the mobile of the nodes' geopositions, which eliminates the need for pre-programming of this information. One such system, incorporating acoustic communications in combination with an LBL approach, is described in U.S. Pat. No. 5,331,602. This system, however, relies on a costly and inconvenient apparatus of multiple above water nodes.

Another technique is the Ultra Short Baseline (USBL) method, which allows for the use of a single "fixed" point of reference by having several closely positioned transducers on the remote mobile system each nearly simultaneously receiving the same signal from a fixed reference. The system calculates the phase differences of the same signal received at each of the transducers, and from these differences, is able to estimate a bearing for the signal. Present technology adopting this method is prone to many of the drawbacks of LBL in that pre-programmed information about fixed geophysical positions and depths must be coordinated prior to deployment of the system.

It is therefore an object of the invention to provide reliable and relatively inexpensive single base-node methods and systems for determining the locations of mobile underwater systems or divers without requiring pre-programming or synchronization of timing information and/or geophysical and depth information.

It is an additional object of the invention to eliminate above-water visibility of system components while determining the geophysical and depth positions of autonomous underwater systems employing acoustic modems.

Other objects of the invention will, in part, appear hereinafter and, in part, be obvious when the following detailed description is read in connection with the drawings.

SUMMARY OF THE INVENTION

The invention provides a single point reference (base system) enabling underwater acoustic modem systems to obtain the range, bearing, and geoposition of autonomous divers or mobile vehicles, while simultaneously providing access to highly flexible communications. The invention operates in part by monitoring the depth of the autonomous system and the location of a base system and transmitting broadband underwater acoustic signals. By physically analyzing the signals to determine the bearing and distance of travel between the autonomous and base systems and by transmitting depth, geophysical position, range, and/or bearing data within one or more signals, the geophysical position of the autonomous system is calculated.

An embodiment of the invention includes a method in which the remote system sends a location request signal to the base system, which is equipped to analyze and estimate the bearing of the request signal. The base system responds with a message including data about the bearing of the request signal, its known depth (if any) and its known geophysical position. The remote system keeps track of the time it took to transfer the request signal and response signals to estimate the range between the remote and base systems. Using data about its own depth, the range between the remote and base systems, the bearing of the request signal, and the geophysical position and depth (if any) of the base system, the remote system calculates its own geophysical position.

An embodiment of the inventive method establishes a bearing of one the communication signals between the remote and base acoustic modem systems with the use of multiple transducers placed on either the remote or base system by which the phase, time, and range differences of the communications signal can be calculated.

The basic inventive apparatus includes a base acoustic modem system and an autonomous acoustic modem system whose position is unknown. A multi-transceiver array is connected to either the base or autonomous systems. Attaching the array to the base system may be preferable so as to allow sharing the array among multiple autonomous units. The autonomous system includes a depth monitoring device for providing depth information about the autonomous unit. At least one timing device must be connected with either the autonomous or base systems to measure the time of travel of a signal between the two systems and thus determine the range between them. Finally, a processing device is included in at least one of the systems and programmed to calculate the geophysical position of the autonomous unit from the bearing, depth, and range data.

In an embodiment of the invention, a satellite Global Positioning System (GPS) device is attached to the base system in order to monitor the geophysical position of the base acoustic modem system.

In another embodiment, where both the base and autonomous systems may be moving, signals are compensated for the relative motion between the systems.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein.

DETAILED DESCRIPTION

Figure 1A:
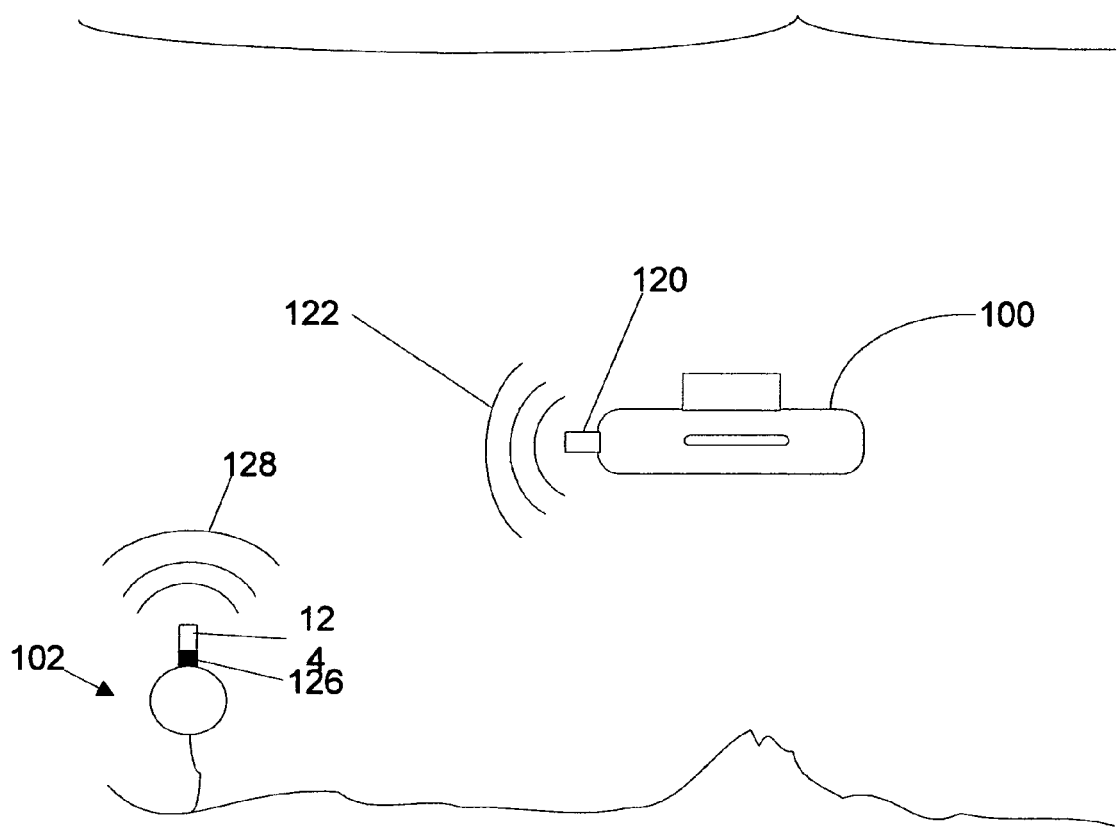
FIG. 1A is a diagrammatic elevational view of an underwater communications environment in which a base node operates with a remote node to establish the remote node's geophysical position.

The invention includes a broadband underwater acoustic modem system which is capable of determining the geophysical position of an autonomous unit while providing a mechanism for transferring data through broadband acoustic signals between base and mobile systems. FIG. 1 illustrates the elements of an embodiment of the invention in an underwater environment. A submersible 100 includes an underwater acoustic modem system with transducer 120 that is used to transmit a request signal 122. A fixed base system 102 receives signal 122 at a multi-transceiver array 126 from which the bearing of signal 122 is determined. The depth, geophysical position of the fixed base system 102 is known and, together with a bearing calculation of the original request signal, is transmitted within a broadband reply signal through a transducer 124 to submersible 100. A timing mechanism (not shown) is employed to measure the time of travel of one or more signals between the systems. This can be accomplished by providing synchronized clocks on both systems or programming the autonomous system with knowledge of the time taken to issue the response signal from the base system and measuring the time of travel (and thus range) between the systems. A processor (not shown) on the submersible 100 can now calculate its own geophysical position knowing its own depth, the depth and geophysical position of the base system, the bearing calculation, and range between the systems.

Figure 1B:
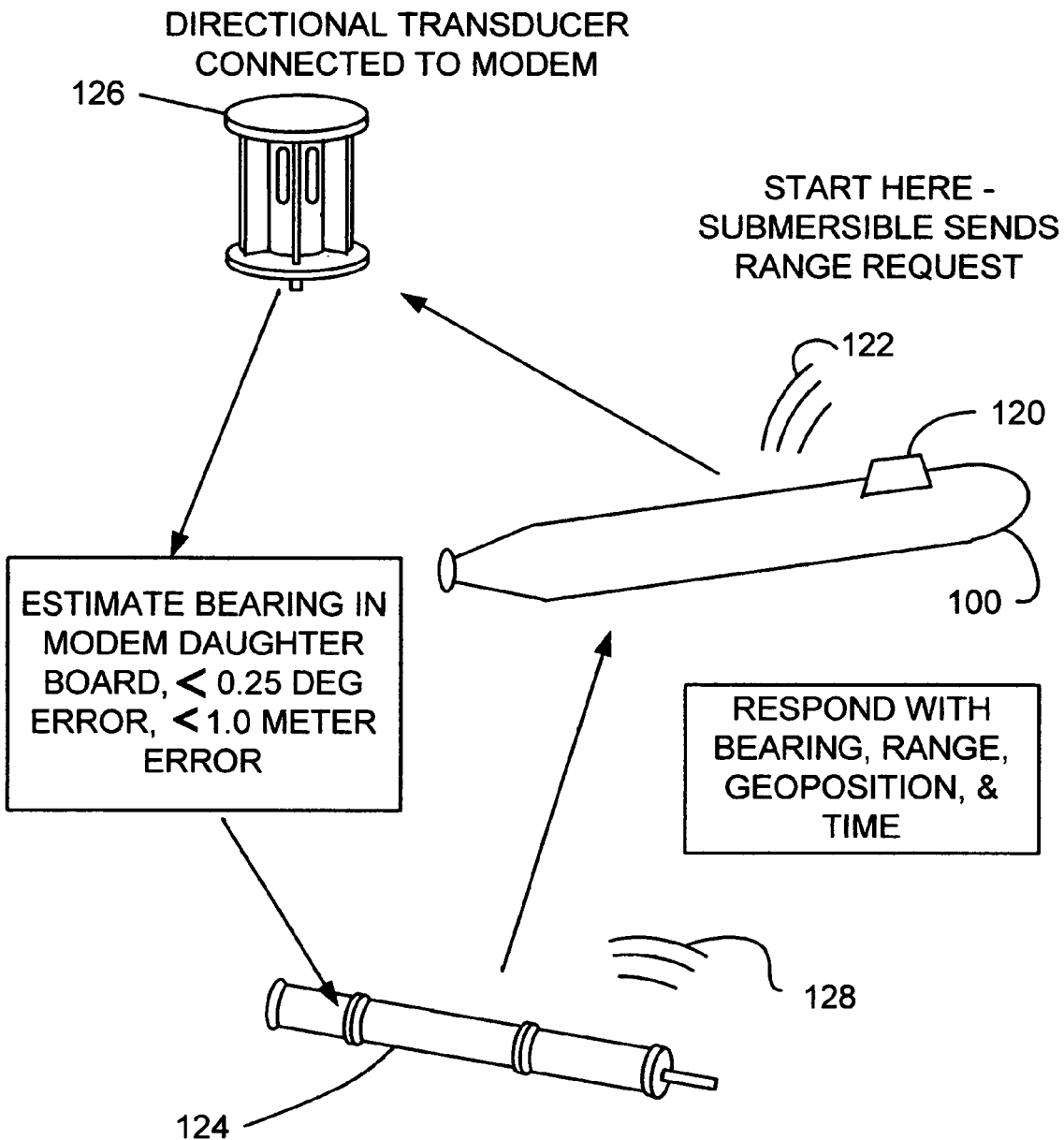
FIG. 1B is a block diagram including an embodiment of the inventive system components and their modes of communication.

FIG. 1b illustrates an overview of the steps according to an embodiment of the inventive method in relation to apparatus components embodied by the invention. Submersible 100 first sends a request signal 122 to a base system (not shown) at a multi-transceiver array 126. A controller (not shown) on the base system estimates the bearing of the request signal by analyzing the signals received at array 126. Finally, the base system sends a response message 128 out of transducer 124 with a message including the depth and geophysical position of the base system and bearing calculation. A controller on the submersible is programmed to calculate the range between itself and the base system based on the time lapse between the request signal and receipt of the response signal and, together with knowledge of its own depth and the data received in the response signal, calculates its own geophysical position.

Figure 2:
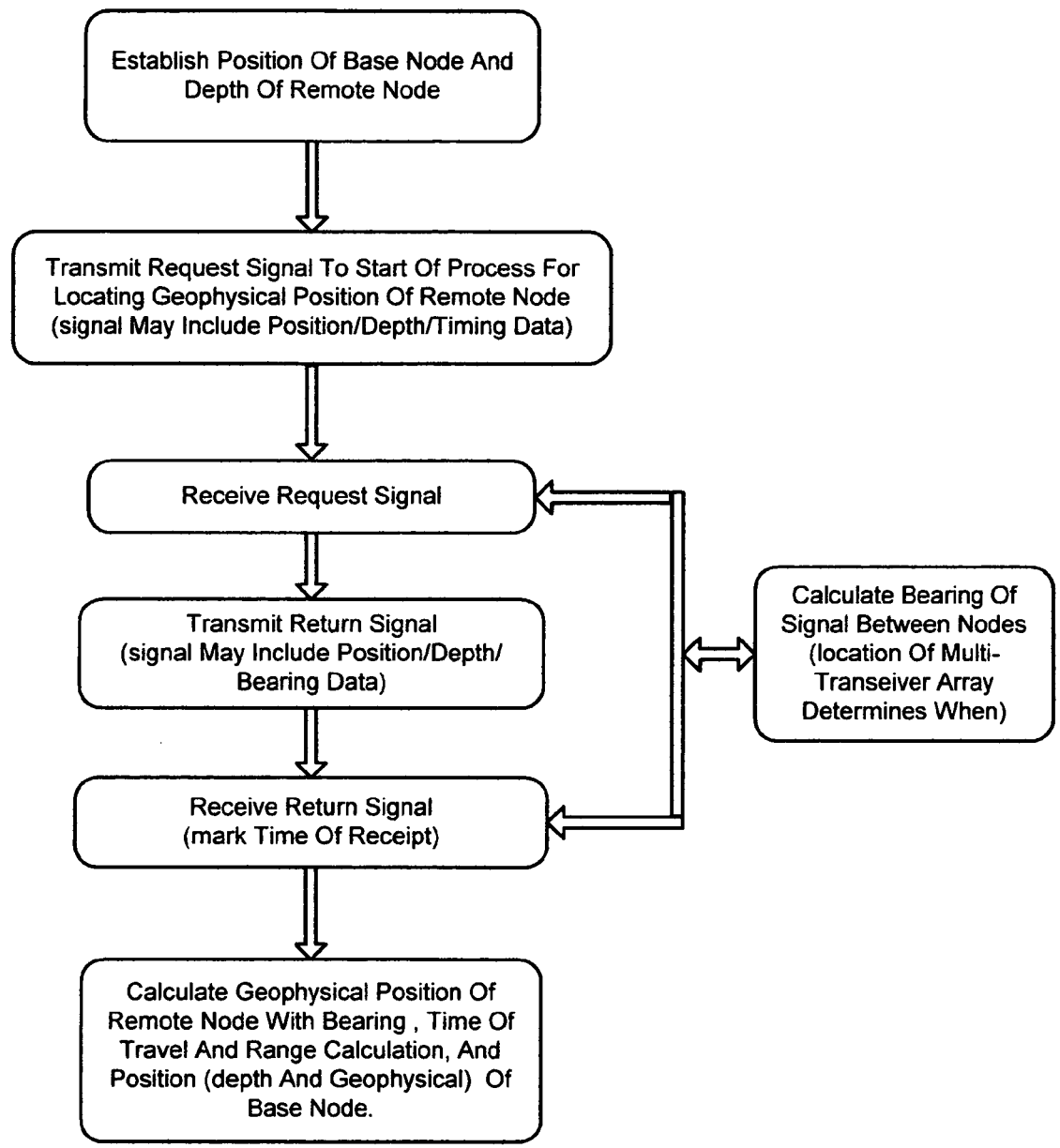
FIG. 2 is a high level flowchart of a method of the invention.

A high level flow chart of the inventive method is presented in FIG. 2, further described as follows. An initial step of the inventive method is to establish the depth and geophysical position of the base acoustic modem system, against which the geophysical position of the autonomous system is referenced. This may be accomplished in a number of ways, including a continuous monitoring of the base system via an above water GPS device. To begin the sequence of determining the position of the autonomous system at a given time, a request signal is transmitted between the systems. Depending on the source of the request signal and arrangement of the apparatus, various data, including depth, known geophysical position, and timing data, are transmitted with the signal and is received at either the autonomous or base systems. At least one of the systems includes a "bearing" determination apparatus, e.g. a multi-transceiver array which calculates the bearing of signals it receives. Thus, a bearing calculation is made based on either a request or a response signal, depending on where bearing determining hardware has been located. The response signal contains any information necessary to complete the calculation of the autonomous system's geophysical position.

Figure 3:
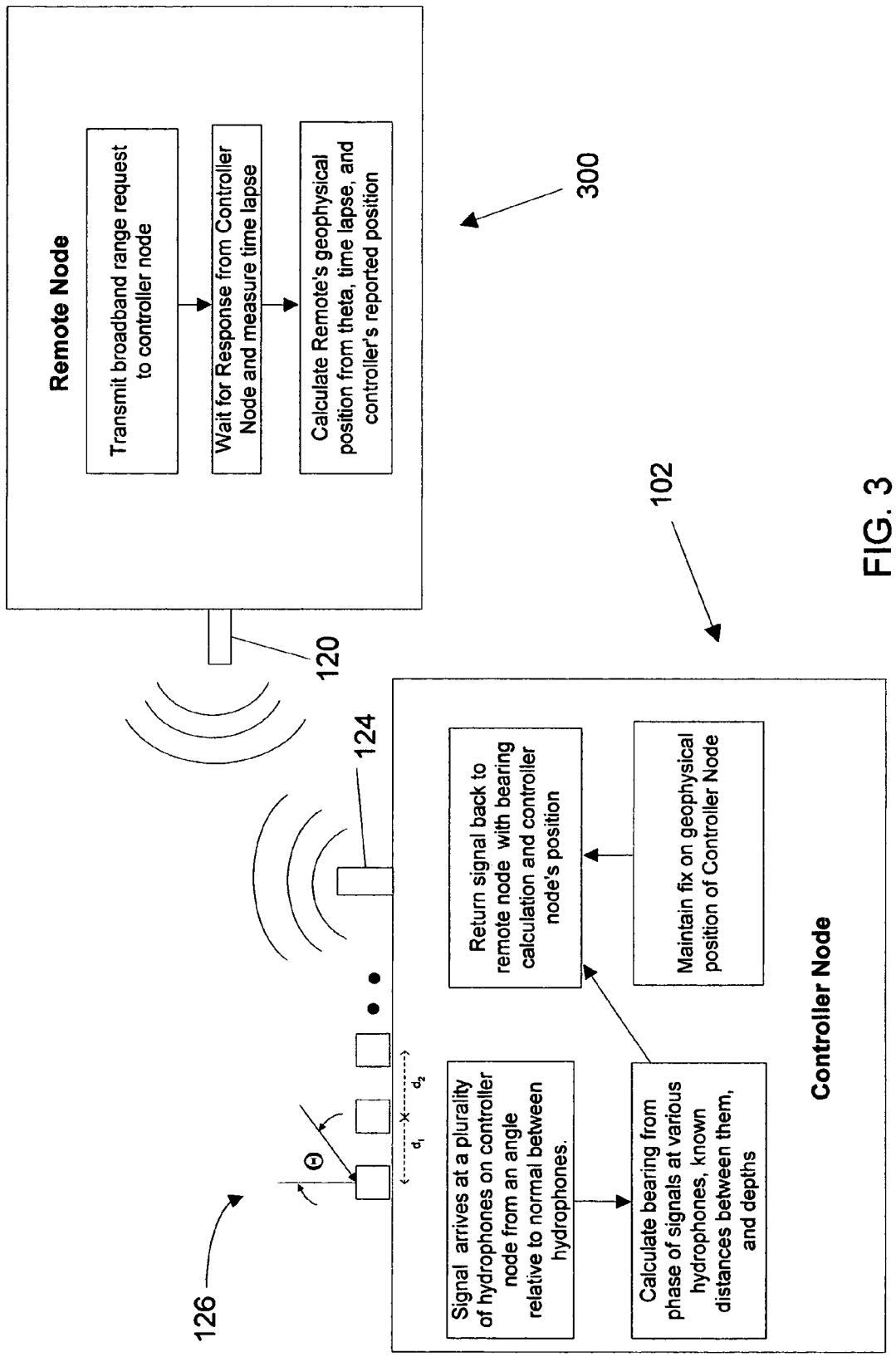
FIG. 3 is a block diagram of a remote modem system and a base modem in accordance with the invention.

FIG. 3 shows a block diagram of a remote modem system 300 and a base modem system 102, showing an embodiment of the inventive steps as they relate respectively to each system.

Figure 4:
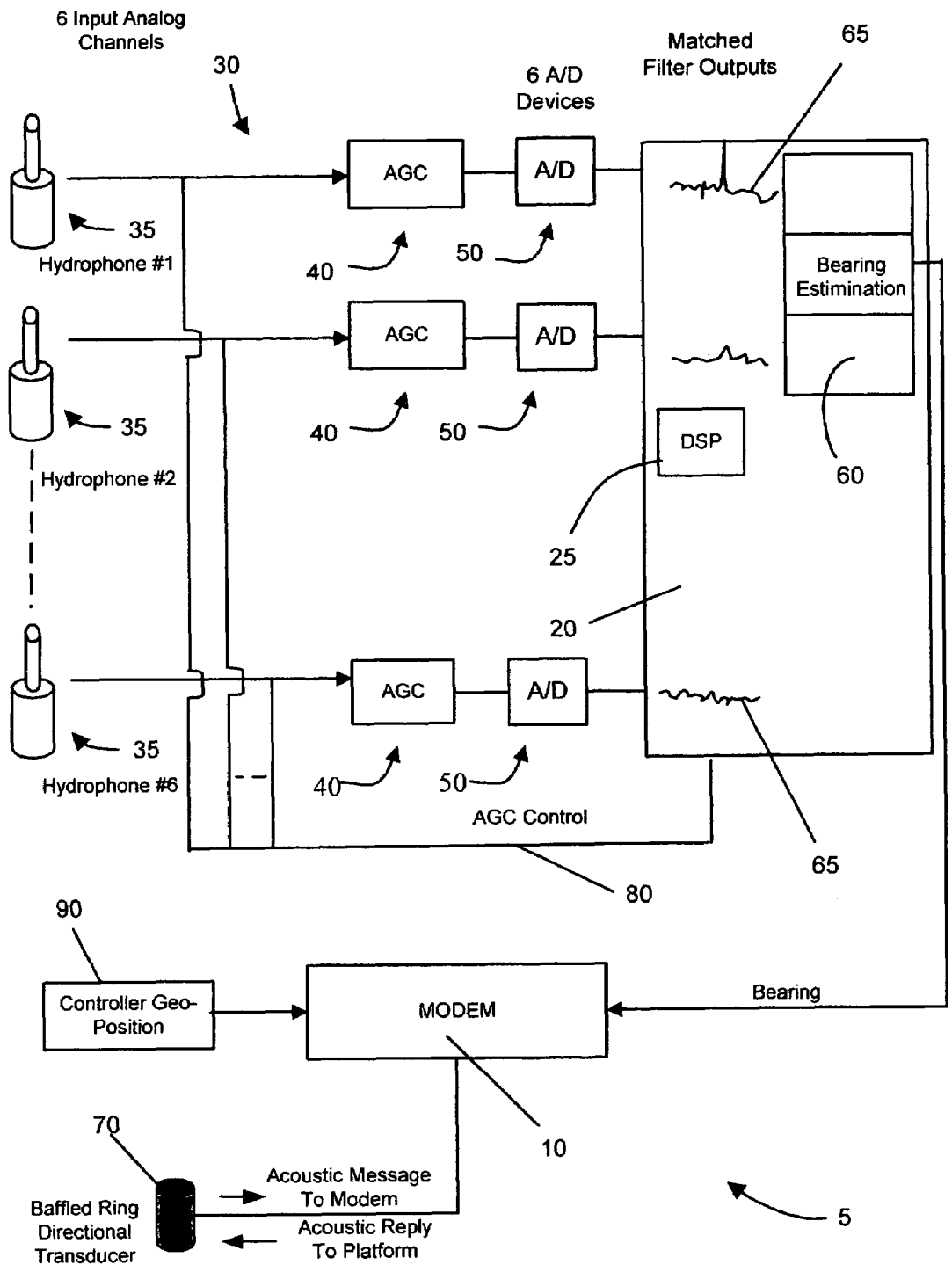
FIG. 4 is a block diagram of a receiver in an embodiment of the invention designed to receive an acoustic signal and estimate its bearing.

In an embodiment of the inventive apparatus shown in FIG. 4, a base modem system 5 is equipped with small multi-element receivers 35 which are used to make a bearing estimation on signals received from the remote modem. This type of arrangement can reduce the burden on the mobile, which would not require much in addition to a modem, compass, and depth finder.

Base system 5 includes modem a 10, a signal processing device 20, and a unique multi-channel array 30 of hydrophones 35. Mathematical algorithms capable of estimating the bearing of the mobile from the output of this system, given a conventional modem signal input, are described in detail later with reference to FIGS. 5*a-c*. This bearing estimate is sent acoustically to the mobile in response along with the geoposition of the base modem system 5. The turn-around time between a mobile request and the response from the base system provides the range between the two. This information, when received by the mobile, is sufficient to locate the geoposition of the vehicle. Again, FIG. 3 shows the sequence of operations involved in this system.

Referring again to FIG. 4, multi-channel hydrophone/transducer array 30 is connected as a number of hydrophone 35. Each hydrophone 35 in the array 30 is connected to an automatic gains control (AGC) 40, whose output is connected to an analog-to-digital (A/D) device 50. The embodiment also includes a controller 20 incorporating a digital signal processor (DSP) 25, and program module 60 for calculating the bearing estimation. Message data is sent and received by modem 10 via a multi-directional transducer 70.

The interface between the physical multi-hydrophone transducer array, associated components, and the digital subsystem is preferably combined with well known packaging technology into a very compact multi-level signal conditioning electronics package, including all necessary signal conditioning and digitizing components. The single board system can be manufactured in approximately the size of a thick dollar bill. DSP 25, integrated with the modem, performs the necessary digital processing of the signals.

Figure 5A:
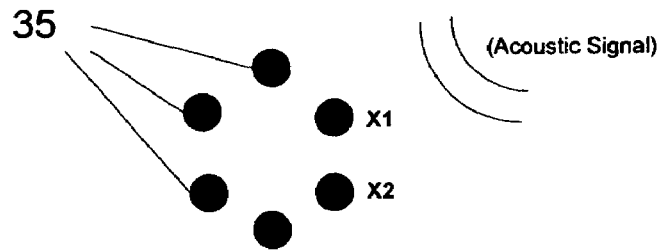
FIG. 5a is a diagram of a circular arrangement of hydrophones.
Figure 5B:
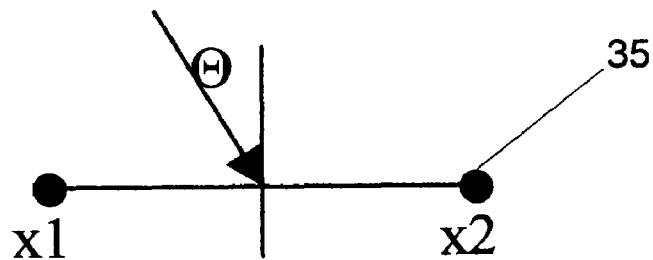
FIG. 5b is a ray diagram representing a sonar signal incident at two hydrophones in an embodiment of the invention.

The physical arrangement of the hydrophones 35 is designed to provide coverage about a substantial area of the system. One embodiment is a circular arrangement as shown in FIG. 5*a*, wherein each hydrophone 35 covers approximately 60 degrees in each direction. Referring back to FIG. 4, the output of each of the 6 pre-amplified hydrophones 35 is sent to a corresponding A/D device 50, after having its amplitude controlled by a corresponding automatic gain control (AGC) 40. The AGCs 40 are controlled by the DSP 25. An example of a DSP device that can be used in this embodiment is manufactured by Texas Instruments (Model TI6711), capable of performing the appropriate signal processing (e.g., matched filtering control 65) on each channel to obtain six versions of the appropriate complex-based filter output. The magnitude squared output is sent through a threshold comparator (not shown) to ascertain the arrival of a signal. The single strongest signal is identified, along with the adjacent channel which is next strongest. These channels provide a complex-based output to module 60 which calculates the bearing and passes the calculation to the modem 10 via an existing RS232 comm port (not shown). DSP 25 provides an AGC Control feedback signal 80 in the event the signal requires additional gain correction. At the same time, directional transducer 70 receives and forwards the signal to the modem for conventional processing as an acomms signal (which may contain, for example, depth and geopositional data). An embodiment of a transducer functional for this purpose is a modified baffled ring directional transducer as described within U.S. Pat. No. 6,768,702, incorporated herein by reference.

After recognizing the received signal as a ranging request, modem 10 generates a return message containing the bearing and the controller geo-position and, as needed, timing data, which are transmitted through directional transducer 70. The original requesting platform receives these data, computes range, estimates it's own geo-position, and may set its internal clock to controller time.

Various geometric-based algorithms may be used for computing a bearing estimation within the above described multi-hydrophone embodiment. In one embodiment, module 60 is programmed to calculate bearing determines which of hydrophone signals are the two strongest. The phase differences between these signals is calculated to determine the difference in time at which a particular signal was received by the two hydrophones. Having the hydrophones placed at a predetermined distances (d) apart from each other and knowing the depths of the base and remote systems, the phase readily translates to bearing, as described as follows.

Typical embodiments of the invention use broadband signals that have a moderate center frequency-to-bandwidth ratio, such as a hyperbolic frequency modulated (HFM). Such signals can be represented by the following equation:

$$A(t)e^{j2\pi F_c t} \qquad (2.1)$$

where A(t) is the (complex) envelope of the signal, and $F_c$ is the center frequency. The chirp duration is T, and its bandwidth is W. Now referring to FIG. 5b, this signal arrives at both of the small hydrophones x1 and x2 from an angle $\Theta$ relative to the normal between them.

A replica correlation at x1 is performed to achieve the approximate arrival time from the correlator output, $R_1(\tau)$. That is $$R_1(\tau) = \frac{1}{T}\int_{\tau-T/2}^{\tau+T/2} A^*(t+\tau)e^{-j2\pi F_c(t+\tau)}A(t)e^{-j2\pi F_c t}dt \quad (2.2)$$

$$= \frac{1}{T}\int_{\tau-T/2}^{\tau+T/2} A^*(t+\tau)A(t)e^{-j2\pi F_c \tau}dt \quad (2.3)$$

$$\equiv R(\tau)e^{-j2\pi F_c \tau} \quad (2.4)$$

where $R(\tau)$ is the (complex) autocorrelation function of $A(\tau)$. Assume that $|R(\tau)|$ is approximately constant (see below).

At the second receiver, $x_2$, the autocorrelation function is represented by:

$$R_2(\tau) = \frac{1}{T}\int_{\tau-T/2}^{\tau+T/2} A^*(t+\tau)e^{-j2\pi F_c(t+\tau)}A(t+L)e^{j2\pi F_c(t+L)}dt \quad (2.5)$$

$$\equiv R(\tau+L)e^{-j2\pi F_c(\tau+L)} \quad (2.6)$$

The peak of $|R(\tau)|$ is determined, and the lag time is chosen to be $\tau=0$. At this time:

$$R_2(L) \approx (\text{constant}) \cdot e^{-j2\pi F_c L} \quad (2.7)$$

and now the phase of $R_1(0)$ is compared with the phase of $R_2(L)$. Let $D=R^*_1(0)R_2(L)$, and note that $R_1(0)\approx 1$ (real). Then the phase angle between the two complex autocorrelations is $$\Phi = \text{atan}(\text{imag}(D), \text{real}(D)) \quad (2.8)$$

where the arc tangent is the 4-quadrant version of its arguments. But in the vicinity of the peak, which is assumed to be nearly constant, $D \approx e^{-j2\pi F_c L}$, so $$\Phi = 2\pi F_c L \quad (2.9)$$

$$= 2\pi F_c(d/c)\cos(\Theta) \quad (2.10)$$

with c=sonic speed (assumed known). Therefore, the desired angle is $$\Theta = \cos^{-1}(\lambda\Phi/(2\pi d)) \quad (2.11)$$

where $\gamma=c/F_c$ is the wavelength at the center frequency.

The requirement that $|R(\tau)|$ be constant is equivalent to a requirement that $1/W > d/c$, which means that $W < c/d$. For example, if W=5 kHz (the ATM 885 standard), and c=1500 m/s, then we are only constrained to d<30 cm. However, a tighter restriction is that $d < \lambda/2$, which, for $F_c=11520$ Hz (standard LF modem), the maximum spacing between hydrophones is approximately 6.5 cm.

The algorithm just described requires the received signals be basebanded (complex, analytic representation) before the bearing estimates are computed. The algorithm can also be implemented at passband (a "real" signal) with a few minor alterations. In particular, the main lobe of the correlation function modulates the carrier sinusoid, which of itself contains no phase information. However, by computing the Fourier Transform of the main lobe region of the two correlations, and comparing their phases, the required datum may be extracted. The results will be the same as with the baseband approach. The importance of this observation is simply computational efficiency. Whereas the baseband approach uses a much lower sample rate during the computation, it does have the added burden of the baseband computation (not a computationally trivial process). The passband approach eliminates the basebanding, but requires that the matched filtering and bearing estimation algorithms be carried out at a relatively high sample rate.

The influence of differential depth between the mobile and the controller introduces an error into the bearing computation. Let $\Theta$ be the bearing estimated by Eqn (2.11). if d is the difference in depth, then, assuming straight-line geometry, it may be shown that the bearing may be corrected for this depth difference accordance to Eqn (2.12)

$$\tilde{\Theta} = \tan^{-1}\frac{\sqrt{R^2\sin^2\Theta - d^2}}{R\cos\Theta} \quad (2.12)$$

The sonar range is considered to follow an ellipsoidal path from remote to base system. This path is a three dimensional path along a "circular" arc that conforms to the arc of an approximate ellipsoid defining the shape of the earth at a given latitude and sonar azimuth. WGS-84 (http://www.wqs84.com) is a well known source for survey data providing this information (i.e. DATUM.a and DATUM.es) and the equations below demonstrate an embodiment of the invention adopting usage of it.

Figure 5C:
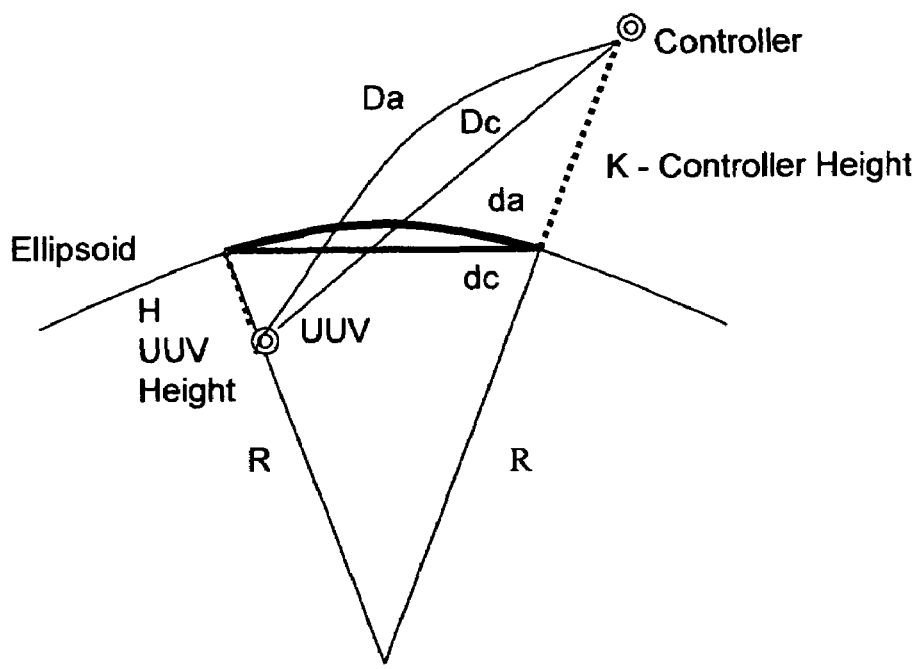
FIG. 5c is a diagram representing the geometric and geopositional relationship between base and remote modem systems.

Ellipsoidal path equations and methods are used to compute a position at some azimuth along a range over the ellipsoid surface. FIG. 5c shows the relationships between different paths between two points. The sonar range (Da) is then converted to a "chord distance" (Dc). This chord distance is the three-dimensional vector (mark to mark) distance. Laurila, Simo H. "Electronic Surveying and Navigation." John Wiley & Sons, New York (1976), gives us a conversion from Da to Dc:

$Dc = 2*R*\sin(Da/(2.0*R))$    (Laurila 1976, Page 117 equation 2.61)

This conversion is based on a local value for the equivalent arc radius for an arc that matches the ellipsoid surface at some azimuth. For this approximate conversion the Controller latitude (lat) and the sonar azimuth (azm) are used and R is calculated from the two radii, the curvature in the meridian (m0 and the curvature in the vertical (n):

m=DATUM.a*(1.0−DATUM.es)/((1.0−DATUM.es*sin(lat)^2)^(3/2));

n=DATUM.a/sqrt(1.0−DATUM.es*sin(lat)^2);

R=n*m/(m*sin(azm)^2+n*cos(azm)^2);

With Dc, the 3-D chord distance, the distance over the ellipsoid surface from the base system to mobile is computed as though both were directly on the surface of the ellipsoid. "da" defines this value such that:

$da = [(12*R^2*M)/(12*(R+H)*(R+K)-M)]^{(1/2)}$    (Laurila 1976, page 204 equation 15.25)

where

M=Dc^2−(H−K)^2 and

H=UUV Height

K=Controller Height

With this ellipsoidal geodesic (on the ellipsoid surface) determined, everything is needed to compute the remote UUV position from the base position, the ellipsoidal range (da), and the azimuth (azm).

The final position can be determined using a number of mathematical techniques that vary in speed and accuracy, depending on the relative range of the remote. Two such methods are embodied in Matlab routines shown below, one (lptdirect.m) that works quickly over a distance of less than 10 km with sub-meter accuracy, and the other (ngsdirect.m) that is slower but that can provide sub-meter accuracies over thousands of kilometers.

```
% ltpdirect.m
% local tangent plane position from range and azimuth
% good for distances less than 10 kilometers
%
function newpos=aproxdirect(pos,range,azimuth);
global DATUM
delta_east=sin(azimuth)*range;
delta_north=cos(azimuth)*range;
n=nphi(pos.lat);
m=mphi(pos.lat);
% convert here changes in meters of easting and northing
% to changes in longitude and latitude
newpos.lon=pos.lon+delta_east(n*cos(pos.lat));
newpos.lat=pos.lat+delta_north/m;
newpos.hea=0;
% ngsdirect.m
% MatLab Script:
% this module takes longitude and latitude for start position
% and the geodetic range and azimuth to a start position
% returns the longitude and latitude of the end position
% References:
% National Geodetic Survey. Forward and Inverse
%                 http://www.ngs.noaa.gov/PC_PROD/
    pc_prod.shtml#lnvFwd
% Vincenty, T. 1975, Direct and Inverse Solutions of Geo-
    desics
% on the Ellipsoid with Application of Nested Equations.
% Survey Review XXII, 176. (April).
%
% module takes position longitude and latitude in radians,
% azimuth in radians
% range in meters
% returns longitude and latitude of end position in radians
%
function posilh=ngsdirect(position,range,azm);
global DATUM;
phi=position.lat;
lambda=position.lon;
f=1.0-sqrt(1.0-DATUM.es);
r=1.0-f;
tu1=r*sin(phi)/cos(phi);
sf=sin(azm);
cf=cos(azm);
if cf==0.0
    baz=0.0;
else
    baz=a tan2(tu1,cf)*2.0;
end
cu=1.0/sqrt(tu1*tu1+1.0);
su=tu1*cu;
sa=cu*sf;
c2a=1.0-sa*sa;
x0=sqrt((1.0/(r*r)-1.0)*c2a+1.0)+1.0;
x=(x0-2.0)/x0;
c0=1.0-x;
c=(x*x/4.0+1.0)/c0;
d=(0.375*x*x-1.0)*x;
tu=((range/r)/DATUM.a)/c;
y=tu;
conv=9999;
i=0;
while abs(y-conv)>10^-30
    i=i+1;
    sy=sin(y);
    cy=cos(y);
    cz=cos(baz+y);
    e=cz*cz*2.0-1.0;
    conv=y;
    x=e*cy;
    y0=e+e-1.0;
    y=(((sy*sy*4.0-3.0)*y0*cz*d/6.0+x)*d/4.0-cz)*sy*d+
        tu;
    if i>30 break;
    end
end
baz=cu*cy*cf-su*sy;
c=r*sqrt(sa*sa+baz*baz);
d=su*cy+cu*sy*cf;
phi2=a tan2(d,c);
c=cu*cy-su*sy*cf;
x=a tan2(sy*sf,c);
c=((-3.0*c2a+4.0)*f+4.0)*c2a*f/16.0;
d=((e*cy*c+cz)*sy*c+y)*sa;
lambda2=lambda+x-(1.0-c)*d*f;
posilh.lon=lambda2;
posllh.lat=phi2;
posilh.hea=0.0;
```

For applications of the invention where the base and autonomous systems move rapidly with respect to each other (e.g., greater than 20 or more knots) and introduce a significant "Doppler" effect in acoustic signal transmissions, compensation is necessary to counter the effects and reliably process data within transmissions. An example of compensating for these effects is described in U.S. application Ser. No. 10/991,765, filed on Nov. 18, 2004, and incorporated herein by reference in its entirety. An embodiment of the technique comprises the steps of generating a communication signal with an acquisition component for providing an initial estimate of the range rate. The acquisition component is a nonlinear frequency modulated signal whose signal characteristics are not substantially affected by the range rate and is preferably in the form of a hyperbolic frequency modulated signal. The initial signal component is followed by a second set of signals, preferably a set of single frequency tonals, that are used to obtain a more precise estimate of range rate. The communication signal is then demodulated using the more precise estimate of range rate to compensate for the effects of range rate on the communication signal so that the communication signal appears to have not been influenced by the effects of range rate.

Having described the invention with reference to particular embodiments, other variations will occur to those skilled in the art based on its teachings, and it is intended that all such variants be within the scope of the invention as defined by the appended claims.

What is claimed is:

1. A method for determining the geophysical position of an autonomous underwater system of uncertain geophysical position, said method comprising the steps of:

monitoring the depth of the autonomous system;

initiating an exchange of broadband acoustic signals between an acoustic modem of said autonomous system and a base unit having an acoustic modem of known geophysical position to share between them information relating to their respective depths, known geophysical position of the base unit, and transit time of the exchanged broadband acoustic signals;

determining the bearing and range between the autonomous system and the base unit; and calculating the geophysical position of the autonomous system based on the bearing, depths of the autonomous system and base unit, and known geophysical position of the base unit.

2. A method for determining the geophysical position of a remote unit that includes an underwater acoustic modem, said method comprising the steps of:

broadcasting a broadband acoustic signal from the underwater acoustic modem of the remote unit in the vicinity of a nearby base unit whose geophysical position and depth are known, said signal including a request for bearing information and the geophysical position of the base unit, wherein a time stamp is stored on the remote unit in reference to the acoustic signal's transmission and wherein information about the base unit's responsiveness to underwater signals in known to the remote apparatus;

receiving the broadband acoustic signal with an underwater acoustic modem on the base unit, determining the bearing from the base unit to the remote unit and transmitting a return broadband acoustic signal containing the bearing, depth, and geophysical position of the base unit; and receiving the return signal at the modem of the remote unit, marking the time of receipt of the return signal and calculating the geophysical position of the remote unit based on the information contained in the return signal and the elapsed time of travel of the acoustic signals.

3. The method of claim 2 wherein the bearing of the acoustic signal from said remote unit to said base unit is obtained by having multiple acoustic transponders on said base unit placed at predetermined locations relative to each other and wherein the phase and timing differences of acoustic signals received by said multiple acoustic transponders is used to triangulate the signal's direction of travel.

4. An apparatus for determining the geophysical position of an autonomous underwater acoustic modem system of uncertain geophysical position, said apparatus comprising:

a base acoustic modem system whose geophysical position and depth are known;

an underwater acoustic multi-transceiver array connected to either the autonomous underwater acoustic modem system or base acoustic modem system so that the directional bearing between the systems can be calculated by analyzing a signal received at said multi-transceiver array;

a depth monitoring device attached to said autonomous underwater acoustic modem system;

at least one timing device connected to said autonomous underwater acoustic modem system or base acoustic modem system so that the range between the systems can be calculated; and a processing device connected to either the autonomous underwater acoustic modem system or base acoustic modem system programmed to calculate the geophysical position of the autonomous underwater system from the known depths of the systems, the bearing between the systems, and range between the systems.

5. The apparatus of claim 4 wherein said multi-transceiver array is attached to the base acoustic modem system;

wherein said at least one timing device is connected to the autonomous underwater acoustic modem system; and wherein said processing device is attached to said autonomous system and programmed to calculate the range between the base and autonomous systems by timing the travel of the outgoing and incoming signals.

* * * * *